(12) United States Patent
Wada et al.

(10) Patent No.: US 9,224,247 B2
(45) Date of Patent: Dec. 29, 2015

(54) THREE-DIMENSIONAL OBJECT PROCESSING DEVICE, THREE-DIMENSIONAL OBJECT PROCESSING METHOD, AND INFORMATION STORAGE MEDIUM

(75) Inventors: Shinya Wada, Kanagawa (JP); Masaaki Oka, Kanagwa (JP)

(73) Assignees: SONY CORPORATION, Tokyo (JP); SONY COMPUTER ENTERTAINMENT INC., Tokyo (JP)

(*) Notice: Subject to any disclaimer, the term of this patent is extended or adjusted under 35 U.S.C. 154(b) by 211 days.

(21) Appl. No.: 12/870,086

(22) Filed: Aug. 27, 2010

(65) Prior Publication Data

US 2011/0074772 A1    Mar. 31, 2011

(30) Foreign Application Priority Data

Sep. 28, 2009    (JP) .................................. 2009-223500

(51) Int. Cl.
    *G06T 19/20*    (2011.01)
(52) U.S. Cl.
    CPC ......... *G06T 19/20* (2013.01); *G06T 2219/2021* (2013.01)
(58) Field of Classification Search
    None
    See application file for complete search history.

(56) References Cited

U.S. PATENT DOCUMENTS

| | | | | |
|---|---|---|---|---|
| 5,701,403 | A | * | 12/1997 | Watanabe et al. .............. 345/419 |
| 8,063,917 | B2 | * | 11/2011 | Igarashi ........................ 345/647 |
| 2003/0071810 | A1 | | 4/2003 | Shoov et al. |
| 2003/0156109 | A1 | * | 8/2003 | Iwanaga ........................ 345/419 |
| 2005/0046625 | A1 | * | 3/2005 | Kawamoto ..................... 345/419 |
| 2006/0109269 | A1 | * | 5/2006 | Jennings et al. ............... 345/424 |
| 2006/0290693 | A1 | * | 12/2006 | Zhou et al. ..................... 345/420 |
| 2009/0040224 | A1 | * | 2/2009 | Igarashi et al. ................ 345/427 |
| 2010/0239140 | A1 | * | 9/2010 | Ruijters et al. ................. 382/130 |

FOREIGN PATENT DOCUMENTS

| | | |
|---|---|---|
| JP | 7-254013 | 10/1995 |
| JP | 2005-502111 | 1/2005 |

OTHER PUBLICATIONS

Fleute et al, Nonrigid 3-D/2-D Registration of Images Using Statistical Models, 1999, MICCAI, pp. 138-147.*
Lu et al, Deformation Modeling for Robust 3D Face Matching, 2008, IEEE.*
Takeo Igarashi, et al. "As-Rigid-As-Possible Shape Manipulation" ACM Transactions on Computer Graphics, vol. 24, No. 3, 2005.
Japanese Office Action dated Jun. 18, 2013, from corresponding Japanese Application No. 2009-223500.

* cited by examiner

*Primary Examiner* — Kee M Tung
*Assistant Examiner* — Xin Sheng
(74) *Attorney, Agent, or Firm* — Katten Muchin Rosenman LLP (57) ABSTRACT

Provided is a three-dimensional object processing device which is configured to: project a three-dimensional object that is disposed in a virtual three-dimensional space onto each of a plurality of projection planes that are set in the virtual three-dimensional space to obtain projected objects; deform each of the projected objects in a corresponding one of the plurality of projection planes; and deform the three-dimensional object in the virtual three-dimensional space based on each of the projected objects, which have been deformed in the corresponding one of the plurality of projection planes.

16 Claims, 5 Drawing Sheets

FIG.6

THREE-DIMENSIONAL OBJECT PROCESSING DEVICE, THREE-DIMENSIONAL OBJECT PROCESSING METHOD, AND INFORMATION STORAGE MEDIUM

BACKGROUND OF THE INVENTION

1. Field of the Invention

The present invention relates to a three-dimensional object processing device for performing processing for deforming a three-dimensional object disposed in a virtual three-dimensional space, a three-dimensional object processing method, and an information storage medium.

2. Description of the Related Art

In a computer game or the like, an object such as a game character is disposed in a two-dimensional or three-dimensional virtual space, and the disposed object is moved or deformed in the virtual space, to thereby represent a situation in the virtual space. As a method of deforming an object in a virtual space in this manner, various types of technologies have been proposed. Specifically, for example, Takeo Igarashi, Tomer Moscovich, John F. Hughes, "As-Rigid-As-Possible Shape Manipulation" (ACM Transactions on Computer Graphics, Vol. 24, No. 3, ACM SIGGRAPH, 2005) discloses technology for deforming a two-dimensional object disposed in a two-dimensional plane.

In a case where a three-dimensional object disposed in a virtual three-dimensional space is deformed, if an internal structure of the three-dimensional object is not taken into consideration, it is difficult to deform the three-dimensional object into a natural shape. Therefore, in order to deform a three-dimensional object, there has been employed a method in which a skeleton model representing a structure of a skeleton, joints, and the like is generated in advance and the entire shape is changed based on the skeleton model, a method in which a physical simulation is executed in consideration of the inside of the object to determine a shape after deformation, or the like.

As described above, in a case where a three-dimensional object is deformed, not only a surface shape of the three-dimensional object, but also an internal structure thereof needs to be taken into consideration so as to execute deformation processing. Therefore, compared to a case where a two-dimensional object on a plane is deformed, there is a tendency for a task such as manually creating a skeleton model to be required or for an amount of arithmetic processing to increase.

SUMMARY OF THE INVENTION

The present invention has been made in view of the above-mentioned circumstances, and an object of the present invention is to provide a three-dimensional object processing device capable of deforming a three-dimensional object by performing relatively simple processing, a three-dimensional object processing method, and an information storage medium.

According to an aspect of the present invention, there is provided a three-dimensional object processing device for executing processing for deforming a three-dimensional object that is disposed in a virtual three-dimensional space, including projection means for projecting the three-dimensional object onto each of a plurality of projection planes that are set in the virtual three-dimensional space, projected object deformation means for deforming each of projected objects that are obtained by projecting the three-dimensional object onto each of the plurality of projection planes in a corresponding one of the plurality of projection planes, and three-dimensional object deformation means for deforming the three-dimensional object in the virtual three-dimensional space based on each of the projected objects, which have been deformed in the corresponding one of the plurality of projection planes.

In the three-dimensional object processing device, the three-dimensional object may include a surface shape including a plurality of surface elements, the projection means may project each of the plurality of surface elements onto each of the plurality of projection planes, and the projected object deformation means may deform each of the projected objects by deforming each of the plurality of surface elements, which have been projected, while maintaining a connection relation among the plurality of surface elements.

Further, in the three-dimensional object processing device, the plurality of projection planes may include three projection planes that are orthogonal to each other, and each of the three projection planes may contain two reference axes from three reference axes set in the virtual three-dimensional space.

Further, the three-dimensional object processing device may further include instruction receiving means for receiving a deformation instruction for the three-dimensional object from a user, which contains designation of a change direction in the virtual three-dimensional space. The projection means may determine a direction of at least one of the plurality of projection planes based on the change direction contained in the deformation instruction.

Further, the three-dimensional object processing device may further include a display unit for displaying an image showing a situation in the virtual three-dimensional space, and a touch sensor for detecting a contact position at which a physical object is in contact with the touch sensor, the touch sensor being disposed parallel to a display screen of the display unit. The instruction receiving means may receive a deformation instruction containing designation of the change direction in the virtual three-dimensional space, which is parallel to a projection plane of the image in response to a movement direction of the contact position that is detected by the touch sensor. The projection means may determine the direction of the at least one of the plurality of projection planes to be parallel to the projection plane of the image based on the change direction.

According to another aspect of the present invention, there is provided a three-dimensional object processing device for executing processing for deforming a three-dimensional object that is disposed in a virtual three-dimensional space and includes a surface shape formed of a plurality of vertices that are connected to each other, including projection means for projecting each of the plurality of vertices onto each of a plurality of projection planes that are set in the virtual three-dimensional space, projected object deformation means for deforming each of projected objects, which is constituted by a plurality of vertices that are obtained by projecting each of the plurality of vertices onto one of the plurality of projection planes, in a corresponding one of the plurality of projection planes, and three-dimensional object deformation means for deforming the three-dimensional object in the virtual three-dimensional space based on each of the projected objects, which have been deformed in the corresponding one of the plurality of projection planes.

According to still another aspect of the present invention, there is provided a three-dimensional object processing method for deforming a three-dimensional object that is disposed in a virtual three-dimensional space, including projecting the three-dimensional object onto each of a plurality of projection planes that are set in the virtual three-dimensional space, deforming each of projected objects that are obtained by projecting the three-dimensional object onto each of the plurality of projection planes in a corresponding one of the plurality of projection planes, and deforming the three-dimensional object in the virtual three-dimensional space based on each of the projected objects, which have been deformed in the corresponding one of the plurality of projection planes.

According to yet still another aspect of the present invention, there is provided a computer-readable information storage medium having recorded thereon a program for executing processing for deforming a three-dimensional object that is disposed in a virtual three-dimensional space, the program causing a computer to function as projection means for projecting the three-dimensional object onto each of a plurality of projection planes that are set in the virtual three-dimensional space, projected object deformation means for deforming each of projected objects that are obtained by projecting the three-dimensional object onto each of the plurality of projection planes in a corresponding one of the plurality of projection planes, and three-dimensional object deformation means for deforming the three-dimensional object in the virtual three-dimensional space based on each of the projected objects, which have been deformed in the corresponding one of the plurality of projection planes.

DETAILED DESCRIPTION OF THE INVENTION

Hereinafter, a detailed description is given of an embodiment of the present invention with reference to the drawings.

Figure 1:
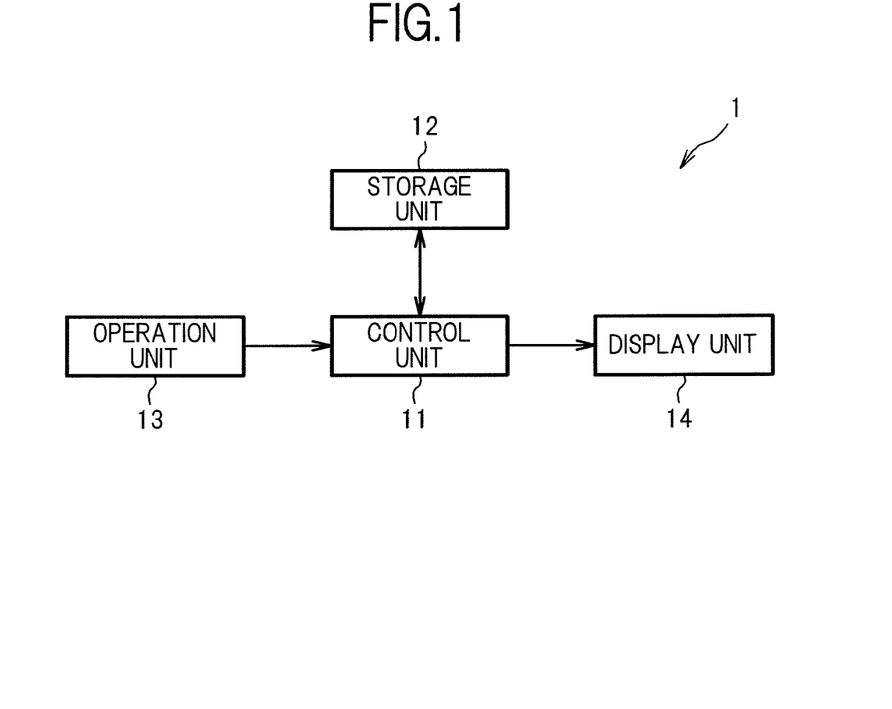
FIG. 1 is a diagram illustrating a configuration of a three-dimensional object processing device according to an embodiment of the present invention.

FIG. 1 is a diagram illustrating a configuration of a three-dimensional object processing device 1 according to the embodiment of the present invention. The three-dimensional object processing device 1 may be, for example, a personal computer or a home-use game machine, and executes deforming processing on a three-dimensional object disposed in a virtual three-dimensional space. As illustrated in FIG. 1, the three-dimensional object processing device 1 includes a control unit 11, a storage unit 12, an operation unit 13, and a display unit 14.

The control unit 11 includes a central processing unit (CPU) or the like, and performs various types of information processing according to a program stored in the storage unit 12. Contents of processing executed by the control unit 11 in this embodiment are described later.

The storage unit 12 includes a memory element such as a random access memory (RAM) or a read-only memory (ROM), and stores a program executed by the control unit 11 and various types of data. Further, the storage unit 12 also functions as a working memory for the control unit 11. In this embodiment, various types of data on the virtual three-dimensional space are stored in the storage unit 12, to thereby construct the virtual three-dimensional space in the three-dimensional object processing device 1.

The operation unit 13 may be a keyboard, a mouse, or a controller of a home-use game machine. The operation unit 13 receives an operation input by a user and outputs a signal indicating a content of the operation to the control unit 11. The display unit 14 may be a liquid crystal display device or the like, and displays various types of images according to an instruction issued by the control unit 11. In this embodiment, the display unit 14 displays an image showing a situation of the three-dimensional object disposed in the virtual three-dimensional space. It should be noted that the operation unit 13 may include a touch sensor for detecting a contact position at which a physical object such as the user's thumb or fingers or a stylus is in contact with the touch sensor. It is desirable that the touch sensor be disposed parallel with a display screen of the display unit 14 so as to be used for inputting the operation to the display screen. Specifically, the touch sensor may be disposed while being superimposed on the display screen of the display unit 14, or may be disposed on a rear surface of a housing of the three-dimensional object processing device 1 so as to be opposed to the display screen of the display unit 14. Further, the touch sensor may include any type of sensor as long as the touch sensor is a device capable of detecting the contact position at which the physical object is in contact with the touch sensor, such as a capacitance sensor, a pressure-sensitive sensor, or an optical sensor, for example.

Figure 2:
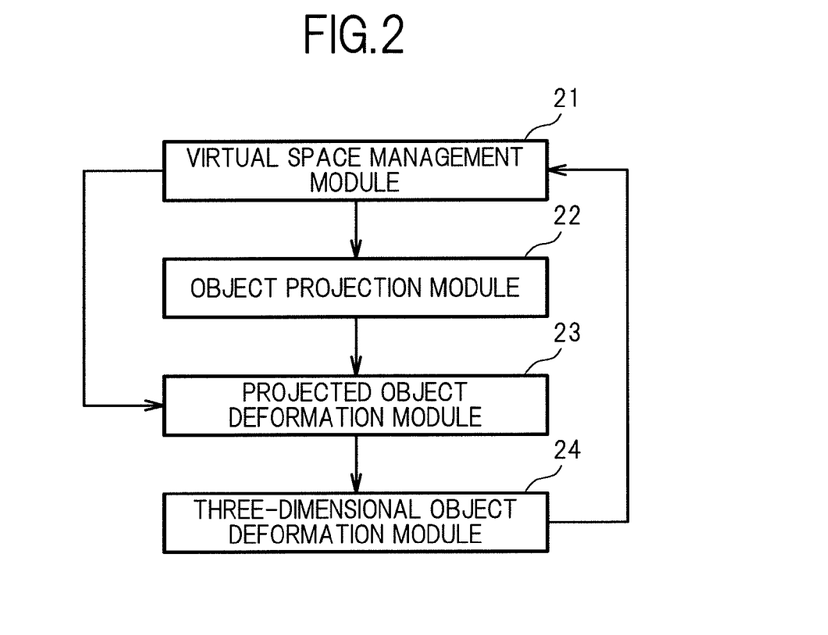
FIG. 2 is a functional block diagram illustrating functions realized by the three-dimensional object processing device according to the embodiment of the present invention.

FIG. 2 is a functional block diagram illustrating functions realized by the three-dimensional object processing device 1 according to this embodiment. As illustrated in FIG. 2, the three-dimensional object processing device 1 functionally includes a virtual space management module 21, an object projection module 22, a projected object deformation module 23, and a three-dimensional object deformation module 24. The functions are realized by the control unit 11 executing the program stored in the storage unit 12. The program may be provided by various types of computer-readable information storage media having the program recorded thereon, such as an optical disc medium, or may be provided via a communication network such as the Internet.

The virtual space management module 21 manages information on a virtual three-dimensional space S constructed in the storage unit 12. Specifically, the virtual space management module 21 disposes a three-dimensional object O in the virtual three-dimensional space S. Further, the virtual space management module 21 functions as instruction receiving means for receiving a manipulation instruction with respect to the three-dimensional object O, which is input by the user through the operation unit 13. Still further, the virtual space management module 21 manages information on a viewpoint position VP and a viewing direction VD set in the virtual three-dimensional space S, and uses the information to render an image showing a situation in the virtual three-dimensional space S when viewed from the viewpoint position VP toward the viewing direction VD. The display unit 14 displays the image rendered by the virtual space management module 21, to thereby allow the user to view the three-dimensional object O disposed in the virtual three-dimensional space S.

Figure 3:
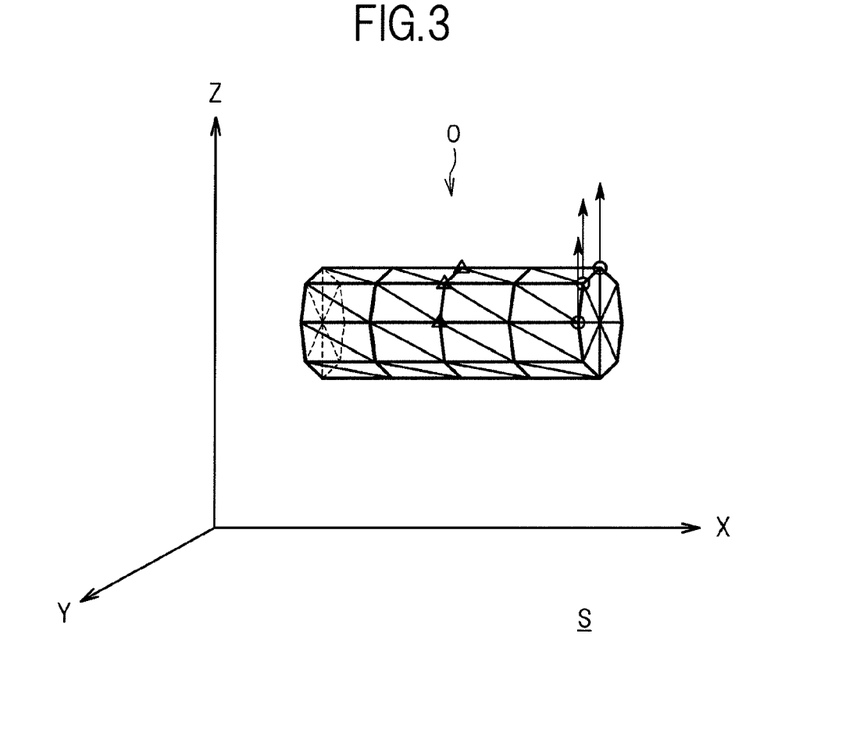
FIG. 3 is a diagram illustrating an example of a three-dimensional object to be processed by the three-dimensional object processing device according to the embodiment of the present invention.

In the following description, as a specific example, the three-dimensional object O to be processed in this embodiment is an approximately cylindrical object and the entire surface thereof is constituted by two approximately circular bottom surfaces and an approximately cylindrical side surface. FIG. 3 is a diagram illustrating a situation in the virtual three-dimensional space S in which the three-dimensional object O is disposed. The three-dimensional object O may include only a surface (outer surface) shape and include no information on an inner structure of the three-dimensional object O. As illustrated in FIG. 3, the surface shape of the three-dimensional object O is constituted by a plurality of surface elements. Here, each of the surface elements is a polygon having a structure of a triangular plane, and such a plurality of planar surface elements together approximately represent a curved surface constituting the surface of the three-dimensional object O. That is, the surface shape of the three-dimensional object O is determined based on position coordinates of vertices of the surface elements constituting the three-dimensional object O and information on a connection relation among the surface elements. It should be noted that the information on the connection relation among the surface elements is information indicating how each vertex is connected to other vertices on the surface of the three-dimensional object O. This information defines vertices and edges shared by the surface elements that are adjacent to each other. In other words, the three-dimensional object O illustrated in FIG. 3 includes the surface shape formed by the plurality of vertices that are connected to each other.

Further, the virtual three-dimensional space S has three reference axes (X axis, Y axis, and Z axis) set to be orthogonal to each other. The position coordinates of each of the vertices of the surface elements are represented by using the three reference axes as a reference.

The object projection module 22 projects the three-dimensional object O onto each of a plurality of projection planes set in the virtual three-dimensional space S. Here, the object projection module 22 projects each of the vertices constituting the surface shape of the three-dimensional object O onto each of three projection planes, that is, a projection plane P1, a projection plane P2, and a projection plane 3 that are set in the virtual three-dimensional space S and orthogonal to each other. That is, the object projection module 22 projects, for each of the projection planes, each vertex of each of the surface elements onto an intersection of a vertical line that passes through the vertex and is orthogonal to the projection plane and the projection plane, to thereby project each of the surface elements constituting the surface of the three-dimensional object O onto each of the three projection planes. It should be noted that in the following description, the projection plane P1 is a ZX plane containing the Z axis and the X axis, the projection plane P2 is an XY plane containing the X axis and the Y axis, and the projection plane P3 is a YZ plane containing the Y axis and the Z axis. Further, two-dimensional objects obtained by projecting the three-dimensional object O onto each of the projection planes P1, P2, and P3 are called projected objects Op1, Op2, and Op3, respectively.

Further, in this description, the object projection module 22 orthogonally projects the three-dimensional object O onto each of the projection planes P1, P2, and P3, but the projection method is not limited thereto. For example, the object projection module 22 may obliquely project the three-dimensional object O onto each of the projection planes so that, for each of the projection planes, lines connecting vertices of each of the surface elements and projection points each make a predetermined angle of other than 90° with the projection plane. Alternatively, lines connecting a predetermined reference point (for example, the viewpoint position VP or a position of a light source set in the virtual three-dimensional space) in the virtual three-dimensional space and vertices may be extended to each of the projection planes to radially project the three-dimensional object O onto each of the projection planes.

Figure 4A:
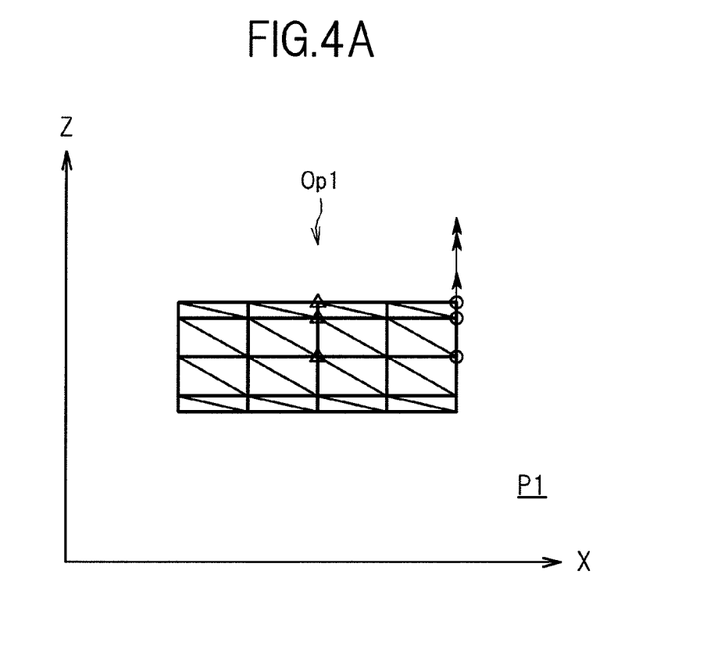
FIG. 4A is a diagram illustrating an example of a projected object obtained by projecting the three-dimensional object illustrated in FIG. 3 onto a projection plane.
Figure 4B:
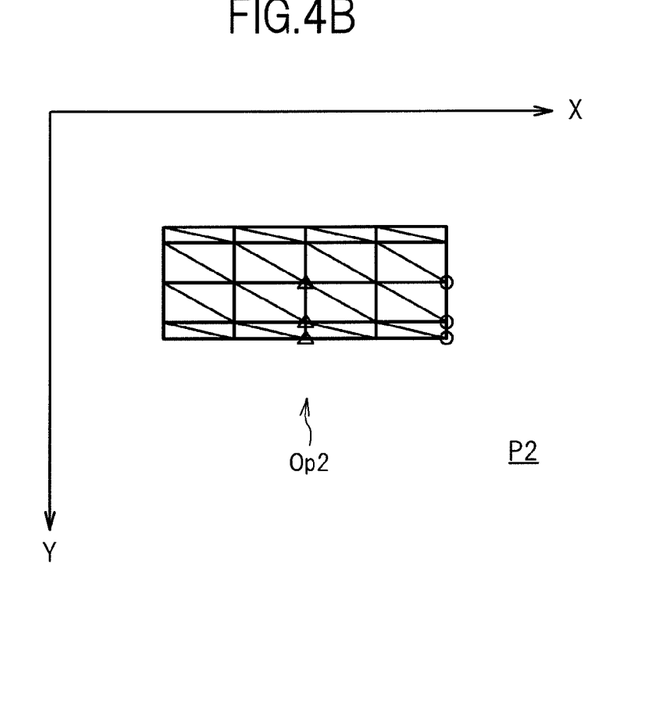
FIG. 4B is a diagram illustrating an example of a projected object obtained by projecting the three-dimensional object illustrated in FIG. 3 onto another projection plane.
Figure 4C:
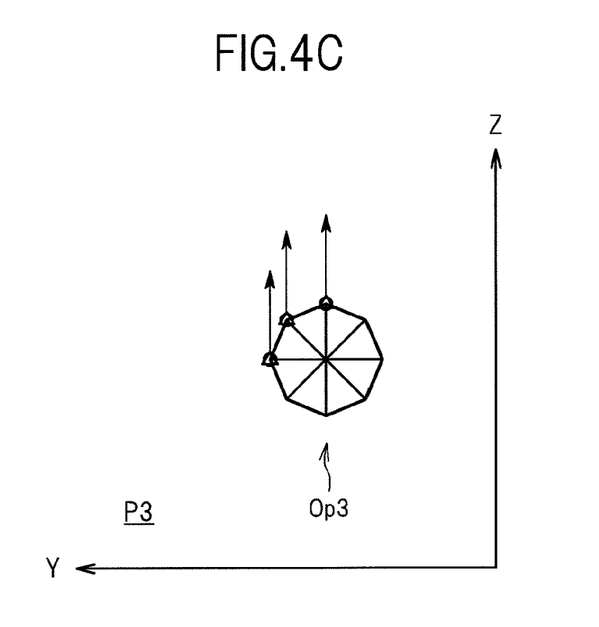
FIG. 4C is a diagram illustrating an example of a projected object obtained by projecting the three-dimensional object illustrated in FIG. 3 onto still another projection plane.

FIGS. 4A, 4B, and 4C illustrate the projected objects Op1, Op2, and Op3, respectively, which are obtained by projecting the cylindrical three-dimensional object O illustrated in FIG. 3 onto each of the projection planes P1, P2, and P3. Here, for example, in FIG. 4C, only one of the bottom surfaces of the cylinder appears to be on the projection plane P3, but actually the surface elements constituting one of the two bottom surfaces are projected to overlap the surface elements constituting the other of the two bottom surfaces. Further, the surface elements constituting the side surface of the cylinder are projected to be substantially linear in shape so as to overlap outer circumferences of the bottom surfaces. Similarly, also in FIG. 4A and FIG. 4B, the surface elements on the front side of the side surface, as well as the surface elements on the rear side of the side surface, are projected to overlap each other. Further, the surface elements constituting the bottom surfaces of the cylinder are projected to overlap ends of the side surface. That is, each of the projected objects Op1, Op2, and Op3 includes all the surface elements constituting the surface shape of the three-dimensional object O.

Further, the surface elements are projected onto each of the projection planes while maintaining the connection relation. That is, the surface elements that are adjacent to each other in the virtual three-dimensional space S still share the same vertices and edges in each of the projection planes as in the virtual three-dimensional space S.

The projected object deformation module 23 deforms the projected objects Op1, Op2, and Op3, which are obtained by the object projection module 22 projecting the three-dimensional object O onto each of the projection planes, in the projection planes P1, P2, and P3, respectively. Specifically, in each of the projection planes, the projected object deformation module 23 moves each of a plurality of projection points obtained by projecting the plurality of vertices forming the surface shape of the three-dimensional object O onto each of the projection planes, while preserving the connection relation among the projection points. Accordingly, the projected surface elements are deformed while preserving the connection relation between them, to thereby deform the whole projected object constituted by the plurality of projection points that are connected to each other.

Here, the projected object deformation module 23 performs deformation processing on each of the projected objects according to a predetermined deformation algorithm and input conditions. The deformation processing executed by the projected object deformation module 23 may be any processing as long as the deformation processing allows the projected object to be deformed while preserving the connection relation among the projection points in each of the projection planes. It should be noted that because the projected object is an object on a two-dimensional plane and is deformed in the projection plane, the deformation algorithm used in this case may be a deformation algorithm used for a two-dimensional object. That is, in order to deform the three-dimensional object O, the three-dimensional object processing device 1 according to this embodiment may also use a deformation algorithm that cannot be directly applied to an object having a three-dimensional structure. Further, the projected object deformation module 23 may execute the deformation processing on one of the projected objects independently of the other projected objects. That is, the deformation processing for one of the projected objects, which is obtained by the projection onto one of the projection planes, is executed independently of results of the deformation processing for the other projected objects that are obtained by the projection onto the other projection planes.

Hereinafter, description is given of a specific example of the deformation processing executed by the projected object deformation module 23 on each of the projected objects. It should be noted that in this description, the projected object deformation module 23 deforms each of the projected objects according to the manipulation instruction input by the user through the operation unit 13. Specifically, the user designates a fixed point (point not to be moved), a position of which is to be fixed, and a deformation point (point to be moved), a position of which is to be changed, from among the vertices of the plurality of surface elements constituting the surface of the three-dimensional object O in a state where the three-dimensional object O is displayed on the screen of the display unit 14. Further, the user designates a direction and an amount of the change of the position of the deformation point in the virtual three-dimensional space S as a deformation instruction with respect to the deformation point. The instruction information is received by the virtual space management module 21 and then input to the projected object deformation module 23.

FIG. 3 illustrates a specific example of content of such a user instruction. In the example illustrated in FIG. 3, three vertices each marked by a triangle correspond to the fixed points, and three vertices each marked by a circle correspond to the deformation points. Further, deformation vectors that respectively represent directions and amounts of change of the deformation points are indicated by arrows starting from the respective deformation points. That is, this example illustrated in FIG. 3 indicates that the user has issued the deformation instruction to move the three deformation points upward in the diagram (that is, in a positive direction of the Z axis). It should be noted that such an instruction to move the deformation point issued by the user may be common among a plurality of deformation points. In this case, the direction and the amount of the change of the deformation point are the same as those of the other deformation point. Alternatively, the user may individually issue the instruction to move the deformation point with respect to the plurality of the deformation points. In this case, the directions and the amounts of the changes of the deformation points may differ from each other.

Further, in a case where the operation unit 13 includes the touch sensor, in a state in which the three-dimensional object O is displayed in the display unit 14, the user may make contact with the touch sensor using the user's thumb or fingers or the stylus at a position corresponding to a position on the displayed three-dimensional object O, and move the user's thumb or fingers or the stylus on the touch sensor while maintaining the contact, to thereby input the deformation instruction. In this case, the position on the surface of the three-dimensional object O corresponding to the contact position on the touch sensor (for example, a vertex being at or closest to the contact position, which is included in the vertices constituting the surface shape of the three-dimensional object O) corresponds to the deformation point, and a direction and a distance that correspond to a direction and an amount of movement of the contact position, respectively, correspond to an instruction for a direction and an amount of deformation with respect to the deformation point. The direction of the deformation in this case may be, for example, a direction perpendicular to the viewing direction VD (that is, a direction parallel to a projection plane of the image).

The projected object deformation module 23 projects the deformation vectors onto each of the projection planes, to thereby determine the directions and the amounts of the changes of the deformation points that are projected onto each of the projection planes. FIGS. 4A, 4B, and 4C illustrate the positions of the fixed points and the deformation points in the projected objects Op1, Op2, and Op3, respectively, and the projected deformation vectors in a case where the manipulation instruction illustrated in FIG. 3 is issued. It should be noted that in this example, the respective deformation vectors for the deformation points are orthogonal to the projection plane P2, and hence the deformation vectors projected onto the projection plane P2 have a magnitude of 0 and do not appear in FIG. 4B.

Based on the fixed points, the deformation points, and the projected deformation vectors, the projected object deformation module 23 deforms each of the projected objects Op1, Op2, and Op3 while changing a plane shape thereof as little as possible. That is, under a condition that the fixed points are not moved and the deformation points are moved in the projection plane in the directions and by the movement amounts indicated by the projected deformation vectors, the projected object deformation module 23 moves the vertices other than the fixed points and the deformation points in the projection plane so that changes of shapes of the surface elements caused by the movement of the deformation points are minimized. Specifically, the projected object deformation module 23 calculates positions of the deformation points after having moved in the directions and by the movement amounts indicated by the projected deformation vectors, and calculates positions of the other vertices by using as a reference the positions of the fixed points and the positions of the deformation points after the movement. Accordingly, the projected objects are deformed in the projection planes in a manner in which the deformation instruction by the user is reflected. Such deformation processing may be realized by the method disclosed in Takeo Igarashi, Tomer Moscovich, John F. Hughes, "As-Rigid-As-Possible Shape Manipulation" (ACM Transactions on Computer Graphics, Vol. 24, No. 3, ACM SIGGRAPH, 2005), for example.

Figure 5A:
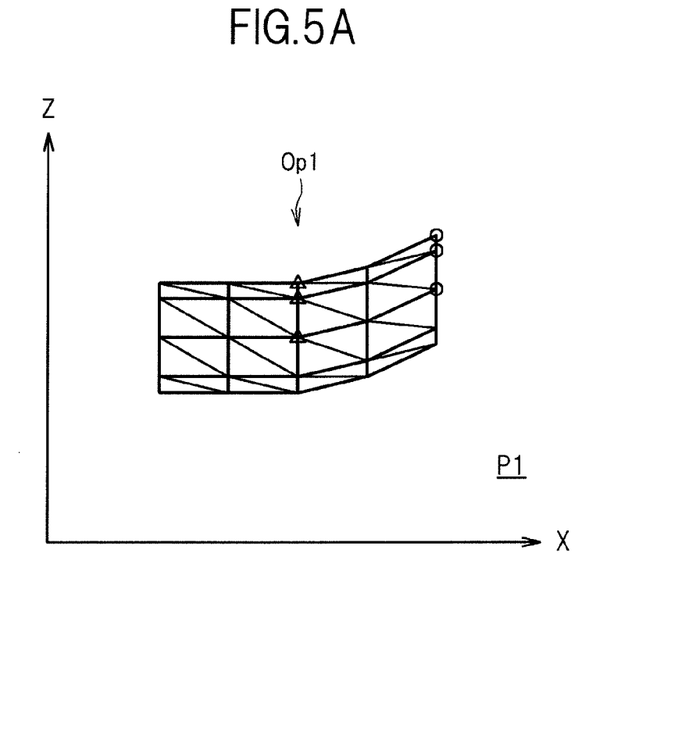
FIG. 5A is a diagram illustrating a situation in which the projected object illustrated in FIG. 4A has been deformed.
Figure 5B:
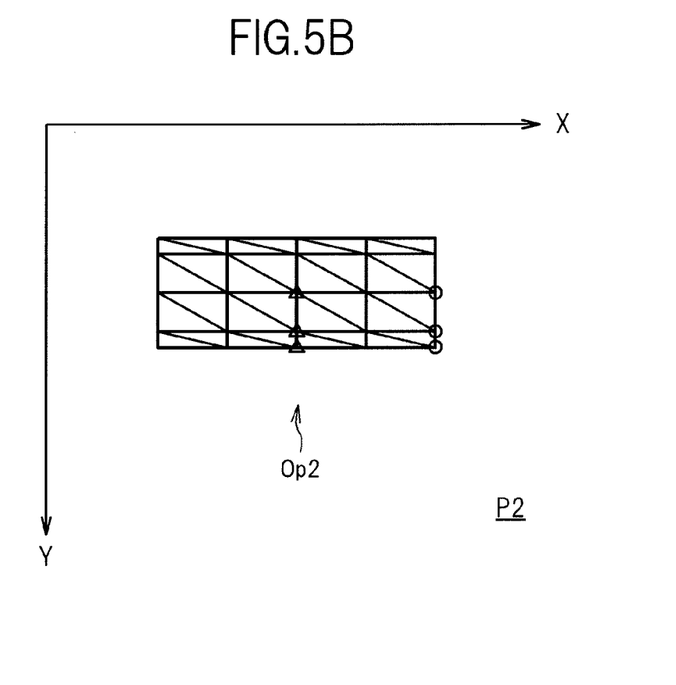
FIG. 5B is a diagram illustrating a situation in which the projected object illustrated in FIG. 4B has been deformed.
Figure 5C:
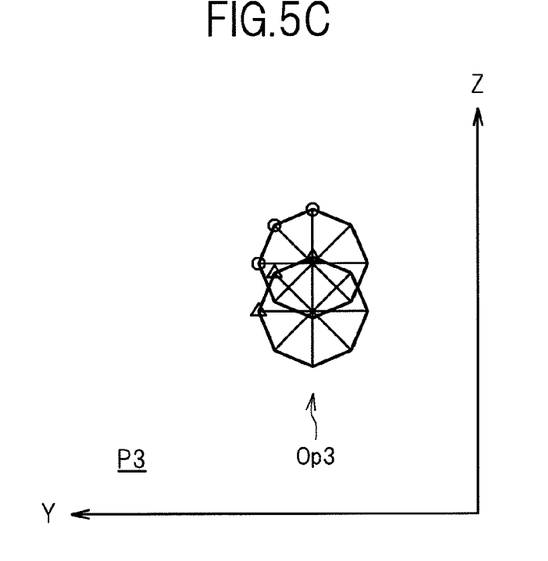
FIG. 5C is a diagram illustrating a situation in which the projected object illustrated in FIG. 4C has been deformed.

FIGS. 5A, 5B, and 5C are diagrams illustrating situations in which the respective projected objects illustrated in FIGS. 4A, 4B, and 4C are deformed according to the respective manipulation instructions illustrated in FIGS. 4A, 4B, and 4C, respectively. As described above, the projected deformation vector has the magnitude of 0 in the projection plane P2, and hence, as illustrated in FIG. 5B, the projected object Op2 maintains its shape without being substantially deformed. On the other hand, as illustrated in FIG. 5A, the projected object Op1 is deformed so that an end of the projected object Op1 is lifted upward. Further, as illustrated in FIG. 5C, the projected object Op3 is deformed so that one of two circles overlapping each other is lifted upward. It should be noted that the deformation of the projected object Op3 causes the surface elements corresponding to the side surface of the cylinder, which have been overlapped on the outer circumferences of the circles, to appear on the projection plane P3, but, for simplicity of illustration, the surface elements corresponding to the side surface of the cylinder are omitted in FIG. 5C.

The projected object deformation module 23 may execute the deformation processing on each of the projected objects according to a deformation algorithm other than the method described above. For example, the projected object deformation module 23 may deform each of the projected objects based on a two-dimensional spring-mass system model. In this case, for example, the vertices of each of the surface elements are regarded as mass points, the edges of the surface element, which connect the vertices with each other, are regarded as springs, and hence each of the projected objects is represented as a set of mass points that are connected with each other by the springs. When the deformation point moves in each of the projection planes based on the deformation vector representing the manipulation instruction by the user, an elastic force is generated in each of the springs in response to the movement, and then the elastic force acts on each of the mass points. The projected object deformation module 23 computes magnitude of the force acting on each of the mass points, to thereby determine a direction and an amount of movement of each of the mass points. By moving each of the vertices based on the direction and the amount of the movement thus determined, the entire projected object may be deformed according to the manipulation instruction by the user. It should be noted that in a case where such a deformation algorithm is directly applied to the three-dimensional object O, mass points and springs for defining the inner structure of the three-dimensional object O are normally arranged inside the three-dimensional object O, but in this embodiment, the two-dimensional objects obtained by projecting the three-dimensional object O onto each of the projection planes are deformed, and hence such mass points and springs for defining the inner structure may not necessarily be provided.

Alternatively, the projected object deformation module 23 may deform the projected object by using a method called free form deformation (FFD). In this case, the projected object deformation module 23 performs deformation so that a part of or the whole of the projection plane in which the projected object is disposed is distorted, to thereby deform the projected object in the projection plane. Also in this case, only deformation on a plane is performed, and hence computation for deforming each of the projected objects requires a lower processing load compared to a case where the virtual three-dimensional space S itself in which the three-dimensional object O is disposed is deformed.

The three-dimensional object deformation module 24 deforms the three-dimensional object O in the virtual three-dimensional space S based on the shapes of the projected objects deformed in the respective projection planes by the projected object deformation module 23. Specifically, the three-dimensional object deformation module 24 combines the shapes of the three projected objects Op1, Op2, and Op3 deformed in the respective projection planes, to thereby determine a shape of the three-dimensional object O after the deformation.

Figure 6:
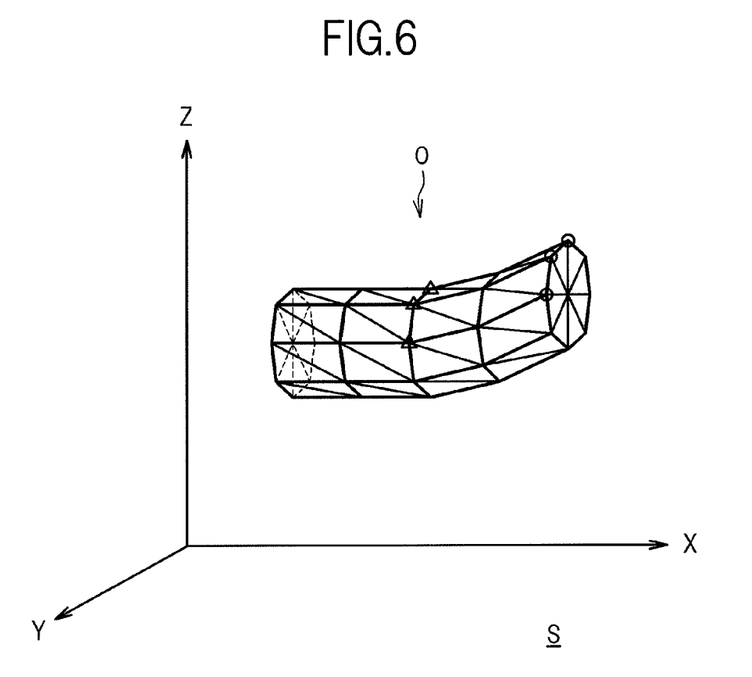
FIG. 6 is a diagram illustrating a situation in which the three-dimensional object illustrated in FIG. 3 has been deformed.

Here, a description is given of a specific example of processing executed by the three-dimensional object deformation module 24. One of the vertices of each of the surface elements constituting the surface shape of the three-dimensional object O is called a vertex V. The vertex V is projected onto each of the three projection planes P1, P2, and P3 by the object projection module 22. Here, points obtained by projecting the vertex V onto the three projection planes P1, P2, and P3 are called projection points Vp1, Vp2, and Vp3, respectively. The projected object deformation module 23 determines a position in the project ion plane of each of the project ion points Vp1, Vp2, and Vp3 after the projected objects have been deformed. Based on the position in the projection plane of each of the projection points Vp1, Vp2, and Vp3 after the deformation, a position of the vertex V after the deformation in the virtual three-dimensional space S is determined. That is, an average value between an X coordinate value of the projection point Vp1 in the projection plane P1 and an X coordinate value of the projection point Vp2 in the projection plane P2 is calculated as an X coordinate value of the vertex V. Similarly, a Y coordinate value of the projection point Vp2 in the projection plane P2 and a Y coordinate value of the projection point Vp3 in the projection plane P3 are used to calculate a Y coordinate value of the vertex V, and a Z coordinate value of the projection point Vp3 in the projection plane P3 and a Z coordinate value of the projection point Vp1 in the projection plane P1 are used to calculate a Z coordinate value of the vertex V. As a result of the calculations, the position coordinates of the vertex V after the three-dimensional object O has been deformed are determined. Similar processing is executed on each of the vertices constituting the surface shape of the three-dimensional object O, to thereby determine position coordinates of each of the vertices in the virtual three-dimensional space S on which the deformation of each of the projected objects has been reflected. Those vertices maintain the connection relation before the three-dimensional object O is projected onto each of the projection planes. Therefore, the surface shape of the entire three-dimensional object O after the deformation is determined by connecting the vertices to each other according to the connection relation. FIG. 6 is a diagram illustrating an example of the three-dimensional object O after the deformation, which is obtained by combining the projected objects Op1, Op2, and Op3 illustrated in FIGS. 5A, 5B, and 5C in a manner described above.

The three-dimensional object O that has been deformed by the three-dimensional object deformation module 24 is displayed on the display unit 14 by the virtual space management module 21 and presented to the user. It should be noted that the projection processing by the object projection module 22, the processing for deforming the projected objects by the projected object deformation module 23, the processing for deforming the three-dimensional object O by combining the projected objects by the three-dimensional object deformation module 24, and the processing for displaying the three-dimensional object O after the deformation by the virtual space management module 21, which are described above, may be repeatedly executed at predetermined time intervals. With this repetition, the user may view how the three-dimensional object O is deforming according to the manipulation instruction input to the operation unit 13 by the user.

With the three-dimensional object processing device 1 according to this embodiment described above, the deformation processing is executed on each of the projected objects that are obtained by projecting the three-dimensional object O onto the plurality of projection planes and results of the deformation processing are combined, to thereby determine the shape of the three-dimensional object O after the deformation. That is, because the deformation processing itself is executed on an object on a plane, the deformation processing may be performed without taking into consideration the inner structure of the three-dimensional object O, and the processing load may be reduced compared to the case where the three-dimensional object O itself is directly deformed. Further, the three-dimensional object O may also be deformed by using the deformation algorithm only for an object on a plane.

It should be noted that embodiments of the present invention are not limited to the embodiment described above. For example, in the above description, the projection planes P1, P2, and P3 are orthogonal to each other and parallel to the three reference axes used for determining the position coordinates, but the projection planes are not limited thereto. That is, the number of the projection planes set in the virtual three-dimensional space S is not necessarily three, but two or four or more projection planes may be used. Further, the projection planes do not need to be parallel to the reference axes and orthogonal to each other.

Here, it is desirable that the number and the directions of the projection planes be selected so that a characteristic of the shape of the three-dimensional object O and a characteristic of the change of the shape are more prominently shown. Therefore, the object projection module 22 may set the projection plane based on the outer shape of the three-dimensional object O. As a specific example, the object projection module 22 selects at least a plane parallel to a longitudinal direction (direction in which a distance between the ends of the three-dimensional object O is longest) of the three-dimensional object O as the projection plane. For example, with regard to the cylindrical object illustrated in FIG. 3, a shape obtained when the cylindrical object is viewed from the side of the side surface has larger degrees of freedom in the deformation than a shape obtained when the cylindrical object is viewed from the side of the bottom surface. Accordingly, such a plane where the three-dimensional object O is projected in a direction in which the three-dimensional object O is viewed from the side of the side surface is preferentially set as the projection plane, to thereby allow a characteristic deformation of the three-dimensional object O to be shown. Alternatively, the object projection module 22 may select a plane in which an area occupied by the projected object in the projection plane becomes the largest as one of the projection planes.

Further, the object projection module 22 may determine the projection plane based on a direction of the deformation instruction (that is, direction of the deformation vector) with respect to the deformation point. If the user issues the deformation instruction, it is preferable that at least the deformation of the three-dimensional object O according to the direction of the deformation vector be clearly presented to the user. In order to achieve this, a plane parallel to the direction of the deformation vector is selected as the projection plane, to thereby allow the three-dimensional object O to be deformed so that the deformation instruction indicated by the deformation vector is reflected more. It should be noted that if the deformation instructions are issued with respect to the plurality of deformation points, the object projection module 22 may determine the projection plane based on a direction of a combined vector obtained by combining a plurality of deformation vectors. Further, the object projection module 22 may determine the respective directions of the plurality of projection planes based on the respective directions of the plurality of deformation vectors.

Further, the object projection module 22 may determine the projection plane based on the viewing direction VD. If the three-dimensional object processing device 1 displays a situation in the virtual three-dimensional space S when viewed along the viewing direction VD on the display unit 14, a presented change of the shape, which is made in a direction perpendicular to the viewing direction VD, is easy to recognize for the user, while a change that is made in a direction parallel to the viewing direction VD hardly appears on the screen. In view of this, the object projection module 22 may select at least a plane perpendicular to the viewing direction VD as one of the projection planes, to thereby reflect the change of the shape, which easily appears on the screen, on the deformation of the entire three-dimensional object O.

It should be noted that the plurality of criteria for determining the direction of the projection plane, which are described above, may be used in combination. For example, the object projection module 22 may select the plane parallel to the longitudinal direction of the three-dimensional object O as one of the plurality of projection planes, and the plane orthogonal to the viewing direction VD as another one of the plurality of projection planes. Alternatively, the object projection module 22 may select, as one of the projection planes, a plane that has a small inclination with respect to the longitudinal direction of the three-dimensional object O and has a large inclination with respect to the viewing direction VD.

Further, the object projection module 22 may change the direction of the projection plane and reexecute the projection processing on the three-dimensional object O depending on the shape of the projected object obtained by projecting the three-dimensional object O. For example, if many of the surface elements constituting the surface shape of the three-dimensional object O are orthogonal to the projection plane, such surface elements become linear in shape with no size (area) when projected onto the projection plane. However, because the projected object is deformed by changing the shapes of the surface elements depending on a type of the deformation algorithm, if many of the surface elements are projected to be linear in shape, there may be a case where the deformation processing is difficult to execute normally. In view of this, in such a case, the object projection module 22 may change the direction of the projection plane by a predetermined amount and execute the projection processing again, to thereby reduce the number of the surface elements projected to be linear in shape.

Here, if the projection planes are orthogonal to each other and parallel to the reference axes as described above, the positions of the vertices in the virtual three-dimensional space S may be determined simply by calculating averages of position coordinate values of the projection points in the projection planes to combine the positions of the projection points in the projection planes. However, in a case where a part of or all of the projection planes obliquely intersect with the reference axes for defining the position coordinates, when the three-dimensional object deformation module 24 combines the positions of the projection points obtained by the projection onto each of the projection planes, the three-dimensional object deformation module 24 needs to take into consideration inclinations of each of the projection planes with respect to the reference axes and perform correction on the position coordinate values in each of the projection planes, to thereby calculate the averages of the position coordinate values in the projection planes.

As a specific example, a description is given of a case where two projection planes P1 and P2 are set in the virtual three-dimensional space S, the projection plane P1 is the ZX plane similarly to the above-mentioned example, and the projection plane P2 is a plane that contains the X axis and makes an angle of 45° with each of the Y axis and the Z axis. Here, position coordinates obtained after processing for moving a projection point obtained by projecting a vertex V1 onto the projection plane P1 are represented as (u1, v1) and position coordinates obtained after processing for moving a projection point obtained by projecting the vertex V1 onto the projection plane P2 are represented as (u2, v2). It should be noted that position coordinates on the projection plane P1 are represented as having a position along the X axis of the virtual three-dimensional space S as a first component, and a position along the Z axis of the virtual three-dimensional space S as a second component. Further, position coordinates on the projection plane P2 are represented as having a position along the X axis of the virtual three-dimensional space S as a first component, and a position along an axis orthogonal to the X axis as a second component. In this case, a position of the vertex V1 in the virtual three-dimensional space S after the deformation of the three-dimensional object O is calculated from the positions of the two projection points as follows.

X coordinate value: $(u1+u2)/2$

Y coordinate value: $v2 \times \sin 45°$

Z coordinate value: $(v1+v2 \times \cos 45°)/2$

Further, also in a case where the object projection module 22 obliquely projects the vertices constituting the three-dimensional object O onto each of the projection planes (that is, in a case where projection directions for the vertices obliquely intersect with the projection planes), the three-dimensional object deformation module 24 takes into consideration inclinations of the projection directions with respect to each of the projection planes, performs correction on the position coordinate values of the projection points in each of the projection planes, and then calculates the averages of the position coordinate values of the projection points in the projection planes. The correction processing in this case may be similar to the correction processing described above for the case where the projection plane is oblique to the reference axes. Further, in a case where the object projection module 22 radially projects the vertices, the three-dimensional object deformation module 24 may take into consideration aspects of the projection (for example, angle of the projection direction for each of the vertices with respect to the projection plane, distance between a reference point for the projection and the vertex, and distance between the reference point and the projection point corresponding to the vertex) to execute the processing for combining the plurality of projection points corresponding to the vertices.

It should be noted that when the projection points on the projection planes are combined to calculate the vertex positions after the deformation in the virtual three-dimensional space S, weighting processing may be performed on each of the projection planes to calculate the averages of the coordinate values in the projection planes. A weighting factor in this case is determined based on which projection plane is an important projection plane in which the deformation of the projected object is performed. For example, if, as described above, the direction of a part of the plurality of projection planes is determined based on the outer shape of the three-dimensional object O, the viewing direction VD, the direction of the deformation vector, or the like, the three-dimensional object deformation module 24 may set the weighting factor for the part of the plurality of projection planes to be larger than those for the other projection planes. Further, even if the projection plane itself is determined irrespective of the information described above, the three-dimensional object deformation module 24 may determine the weighting factor for each of the projection planes based on the outer shape of the three-dimensional object O, the viewing direction VD, the direction of the deformation vector, or the like. For example, the three-dimensional object deformation module 24 determines the weighting factor for each of the projection planes so that the larger weighting factor is set for the projection plane that has a smaller inclination with respect to the longitudinal direction of the three-dimensional object O, that has a larger inclination with respect to the viewing direction VD, or that has a smaller inclination with respect to the direction of the deformation vector. By performing such a control, the three-dimensional object O may be deformed so that deformation in a direction along the longitudinal direction of the three-dimensional object O, deformation in a direction that intersects with the viewing direction VD, or deformation in a direction along a manipulation direction, is highlighted.

It should be noted that such criteria for determining the weighting factor for each of the projection planes may also be used in combination. For example, the three-dimensional object deformation module 24 may determine the weighting factor for each of the projection planes based on both of an inclination of the projection plane with respect to the viewing direction VD and an inclination of the projection plane with respect to the deformation vector.

Further, in the above description, the surface shape of the three-dimensional object O is constituted by the surface elements. However, the present invention is not limited thereto, and the surface shape may be configured based on information for defining a plurality of vertex positions and a connection relation among the plurality of vertices. If a spring-mass model is used, the deformation processing may be performed only by using such information. Further, in the above description, the three-dimensional object O includes no information on its inner structure. However, the three-dimensional object O may be configured with the information on its inner structure included therein. Specifically, for example, the three-dimensional object O may be configured based on a skeleton model for defining the inner structure and a skin for surrounding the skeleton model. In this case, the object projection module 22 projects the skeleton model onto each of the projection planes, and then projected skeleton models obtained by projecting the skeleton model onto each of the projection planes are projected objects that are to be deformed by the projected object deformation module 23. That is, the projected object deformation module 23 deforms the projected skeleton model on each of the projection planes based on the manipulation instruction by the user and the three-dimensional object deformation module 24 deforms the skeleton model in the virtual three-dimensional space S based on information on the projected skeleton model that has been deformed on each of the projection planes. The three-dimensional object O in the virtual three-dimensional space S is thus deformed. Also in this case, the deformation processing is performed on an object in a two-dimensional space, and hence the processing load may be reduced compared to the case where the three-dimensional object O is directly deformed.

Further, in the above description, the three-dimensional object processing device 1 itself renders the image showing a situation in the virtual three-dimensional space S and displays an image representing the three-dimensional object O on the display unit 14. However, the three-dimensional object processing device 1 may execute the deformation processing on the three-dimensional object O in response to a request from an external client device and perform no rendering processing itself. In this case, the three-dimensional object processing device 1 executes the processing for deforming the three-dimensional object O based on information on deformation instruction input from the external client device and sends as a response information indicating the resulting shape of the deformed three-dimensional object O to the external client device.

Further, in the above description, the deformation for each of the projected objects is performed based on the deformation instruction input by the user to the operation unit 13. However, a content of the deformation may be determined, for example, based on a content of processing of an application program that defines the shape of the three-dimensional object O.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A three-dimensional object processing device for executing processing for deforming a three-dimensional object that is disposed in a virtual three-dimensional space, comprising:
   an instruction receiving unit configured to receive a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space,
   wherein the deformation instructions are only received in the virtual three-dimensional space;
   a projection unit configured to project the three-dimensional object onto a plurality of intersecting projection planes that are set in the virtual three-dimensional space to obtain a plurality of projected objects and to project the deformation instructions onto the plurality of intersecting projection planes;
   a projected object deformation unit configured to deform each of the projected objects that are obtained by projecting the three-dimensional object onto each of the plurality of intersecting projection planes in a corresponding one of the plurality of intersecting projection planes,
   wherein the projected object deformation unit deforms the projected objects using a corresponding projected deformation instruction and a 2D deformation algorithm in each of the plurality of intersecting projection planes; and
   a three-dimensional object deformation unit configured to combine the deformed projected objects to determine and display a shape of the three-dimensional object after the deformation.

2. The three-dimensional object processing device according to claim 1, wherein:
   the projection unit projects each of the plurality of surface elements onto the plurality of intersecting projection planes; and
   the projected object deformation unit deforms each of the projected objects by deforming each of the plurality of surface elements, which have been projected, using the corresponding projected deformation instructions while maintaining a connection relation among the plurality of surface elements.

3. The three-dimensional object processing device according to claim 1, wherein the plurality of intersecting projection planes comprises three orthogonal projection planes, and each of the three intersecting projection planes contains two reference axes from three reference axes set in the virtual three-dimensional space.

4. The three-dimensional object processing device according to claim 1,
   wherein the projection unit determines a direction normal to the plane of at least one of the plurality of intersecting projection planes based on the direction of the change contained in the deformation instruction.

5. The three-dimensional object processing device according to claim 4, further comprising:
   a display unit for displaying an image showing a situation in the virtual three-dimensional space; and
   a touch sensor for detecting a contact position at which a physical object is in contact with the touch sensor,
   the touch sensor being disposed parallel to a display screen of the display unit, wherein:
   the instruction receiving unit receives the deformation instruction containing designation of the change direction in the virtual three-dimensional space, which is parallel to a projection plane of the image in response to a movement direction of the contact position that is detected by the touch sensor; and
   the projection unit determines the at least one of the plurality of intersecting projection planes to be parallel to the projection plane of the image based on the direction of the change contained in the deformation instruction.

6. The three-dimensional object processing device according to claim 1, wherein at least one of the plurality of intersecting projection planes is parallel to a direction of the deformation the direction in at least one of the deformation instruction.

7. The three-dimensional object processing device according to claim 1, wherein at least one of the plurality of intersecting projection planes is chosen to be a plane perpendicular to a viewing direction of the three-dimensional object.

8. The three-dimensional object processing device according to claim 1, wherein at least one of the plurality of intersecting projection planes is chosen to be a plane parallel to a longitudinal direction of the three-dimensional object.

9. The three-dimensional object processing device according to claim 1, wherein at least one of the plurality of intersecting projection planes is chosen to be a plane that has a small inclination with respect to a longitudinal direction of the three-dimensional object.

10. The three-dimensional object processing device according to claim 1, wherein at least one of the plurality of intersecting projection planes is chosen to be a plane in which an area occupied by the projected objects becomes the largest.

11. A three-dimensional object processing device for executing processing for deforming a three-dimensional object that is disposed in a virtual three-dimensional space and comprises a surface shape formed of a plurality of vertices that are connected to each other, comprising:
   an instruction receiving unit configured to receive a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space,
   wherein the deformation instructions are only received in the virtual three-dimensional space;
   a projection unit configured to project each of the plurality of vertices and the deformation instructions onto each of a plurality of intersecting projection planes that are set in the virtual three-dimensional space;
   a projected object deformation unit configured to deform each of projected vertices, wherein each of the projected vertices is constituted by a plurality of vertices that are obtained by projecting each of the plurality of vertices onto one of the plurality of intersecting projection planes, in a corresponding one of the plurality of intersecting projection planes, wherein the projected object deformation unit projects the direction and the amount of the deformation onto each of the plurality of intersecting projections planes and deforms the projected objects using the projected direction and the projected amount of the deformation utilizing a 2D deformation algorithm in each of the plurality of intersecting projection planes; and a three-dimensional object deformation unit configured to combine the deformed projected objects to determine and display a shape of the three-dimensional object after the deformation.

12. A three-dimensional object processing method for deforming a three-dimensional object that is disposed in a virtual three-dimensional space, comprising:

receiving a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space, wherein the deformation instructions are only received in the virtual three-dimensional space;

projecting the three-dimensional object onto each of a plurality of intersecting projection planes that are set in the virtual three-dimensional space;

deforming each of projected objects that are obtained by projecting the three-dimensional object onto each of the plurality of intersecting projection planes in a corresponding one of the plurality of intersecting projection planes by projecting the deformation instructions onto each of the plurality of intersecting projecting planes and deforming the projected objects in each of the plurality of intersecting projection planes using the projected deformation utilizing a 2D deformation algorithm; and combining the deformed projected objects from the plurality of intersecting projection planes to determine and display a shape of the three-dimensional object after the deformation.

13. A non-transitory computer-readable information storage medium having recorded thereon a program for executing processing for deforming a three-dimensional object that is disposed in a virtual three-dimensional space, the program causing a computer to function as:

an instruction receiving unit configured to receive a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space, wherein the deformation instructions are only received in the virtual three-dimensional space;

a projection unit configured to project the three-dimensional object onto each of a plurality of intersecting projection planes that are set in the virtual three-dimensional space;

a projected object deformation unit configured to deforms each of projected objects that are obtained by projecting the three-dimensional object onto each of the plurality of intersecting projection planes in a corresponding one of the plurality of intersecting projection planes, wherein the projected object deformation unit projects the deformation instructions onto each of the plurality of intersecting projection planes and deforms the projected objects in each of the plurality of intersecting projection planes using the projected deformation instructions utilizing a 2D deformation algorithm; and a three-dimensional object deformation unit configured to combine the deformed projected objects to determine and display a shape of the three-dimensional object after the deformation.

14. A three-dimensional object processing device for executing processing for deforming a three-dimensional object that is disposed in a virtual three-dimensional space, comprising:

an instruction receiving unit configured to receive a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space, wherein the deformation instructions are only received in the virtual three-dimensional space;

a projection unit configured to project the three-dimensional object onto each of a plurality of intersecting projection planes that are set in the virtual three-dimensional space to obtain projected objects and to project the deformation instructions onto the plurality of intersecting projection planes;

a projected object deformation unit configured to deforms each of the projected objects in a corresponding one of the plurality of intersecting projection planes using at least one corresponding projected deformation instruction and a 2D deformation algorithm in each of the plurality of intersecting projection planes; and a three-dimensional object deformation unit configured to combine the deformed projected objects to determine and display a shape of the three-dimensional object after the deformation, wherein the projection unit determines a direction normal to the plane of at least one of the plurality of projection planes based on a direction of change contained in a deformation instruction.

15. A three-dimensional object processing method for deforming a three-dimensional object that is disposed in a virtual three-dimensional space, comprising:

receiving a plurality of deformation instructions which is provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space, wherein the deformation instructions are only received in the virtual three-dimensional space;

projecting the three-dimensional object onto each of a plurality of intersecting projection planes that are set in the virtual three-dimensional space to obtain a plurality of projected objects;

projecting the deformation instructions onto each of the plurality of intersecting projection planes to obtain a plurality of projected deformation instructions, deforming each of projected objects in a corresponding one of the plurality of intersecting projection planes using a 2D deformation algorithm and at least one corresponding projected deformation instruction; and deforming the three-dimensional object in the virtual three-dimensional space by combining the deformed projected objects to determine and display a shape of the three-dimensional object after the deformation, wherein the projecting step further determines a direction normal to the plane of at least one of the plurality of intersecting projection planes based on the direction of change contained in at least one of the deformation instructions.

16. A non-transitory computer-readable information storage medium having recorded thereon a program for executing processing for deforming a three-dimensional object that is disposed in a virtual three-dimensional space, the program causing a computer to function as:

an instruction receiving unit configured to receive a plurality of deformation instructions which are provided in the virtual three-dimensional space for the three-dimensional object from a user, wherein each deformation instruction includes a fixed point on a surface of the three-dimensional object which is a point not to be moved, a deformation point which is a position of which is to be changed from among vertices of a plurality of surface elements constituting the surface of the three-dimensional object, and a direction and an amount of change of the position of the deformation point in the virtual three-dimensional space, wherein the deformation instructions are only received in the virtual three-dimensional space;

a projection unit configured to projects the three-dimensional object onto each of a plurality of intersecting projection planes that are set in the virtual three-dimensional space to obtain a plurality of projected objects and to project the deformation instructions onto the plurality of intersecting projection planes;

a projected object deformation unit configured to deform each of the projected objects that are obtained by projecting the three-dimensional object onto each of the plurality of intersecting projection planes in a corresponding one of the plurality of intersecting projection planes using at least one corresponding projected deformation instruction and a 2D deformation algorithm in each of the plurality of intersecting projection planes; and a three-dimensional object deformation unit configured to combine the deformed projected objects to determine and display a shape of the three-dimensional object after the deformation, wherein the projection unit determines a direction normal to the plane of at least one of the plurality of intersecting projection planes based on the direction of change contained in at least one of the deformation instructions.

* * * * *